No. 862,552. PATENTED AUG. 6, 1907.
J. E. G. GEISEL.
WHIFFLETREE HOOK.
APPLICATION FILED APR. 23, 1906.
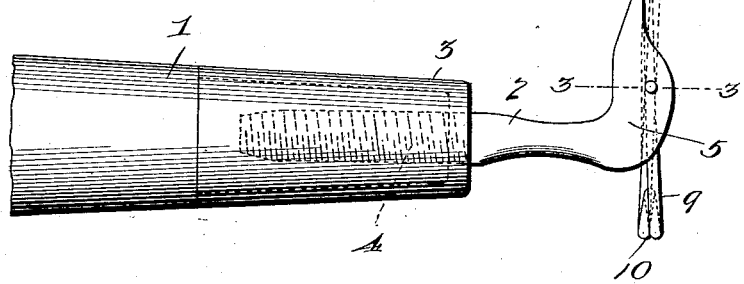
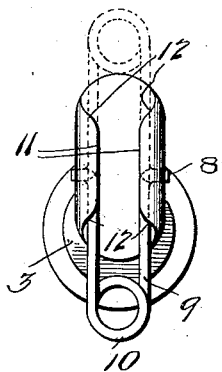
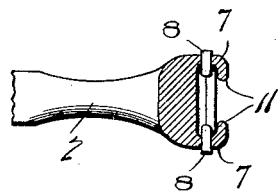
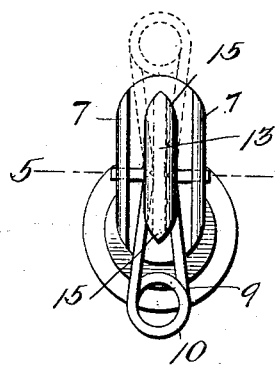
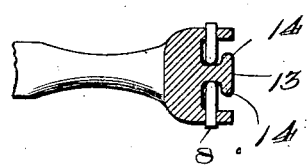
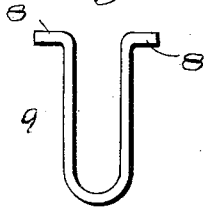
Witnesses
T. L. McShane
James F. Crown
Inventor
John E. G. Geisel
By Rexford M. Smith
Attorney

UNITED STATES PATENT OFFICE.

JOHN E. G. GEISEL, OF LEHIGHTON, PENNSYLVANIA.

WHIFFLETREE-HOOK.

No. 862,552.   Specification of Letters Patent.   Patented Aug. 6, 1907.

Application filed April 23, 1906. Serial No. 313,308.

*To all whom it may concern:*

Be it known that I, JOHN E. G. GEISEL, a citizen of the United States, residing at Lehighton, in the county of Carbon and State of Pennsylvania, have invented a certain new and useful Whiffletree-Hook, of which the following is a specification, reference being had therein to the accompanying drawing.

This invention relates to whiffletree hooks, the object of the invention being to provide a simple, reliable and easily manipulated device for securely retaining the ends of tugs or traces upon the ends of a whiffletree, whereby the tugs or traces may be easily connected with and disconnected from the whiffletree.

With the above general object in view the invention consists in the novel construction, combination and arrangement hereinafter fully described, illustrated and claimed.

In the accompanying drawings: Figure 1 is a plan view of one end of a whiffletree, showing a whiffletree hook, and the trace retaining device of this invention. Fig. 2 is a face view of the hook looking toward the outer face thereof and illustrating the two positions of the trace retainer by full and dotted lines. Fig. 3 is a section on the line 3—3 of Fig. 1. Fig. 4 is a face view similar to Fig. 2 showing a modified arrangement of the under-cut shoulders. Fig. 5 is a section on the line 5—5 of Fig. 4. Fig. 6 is a plan view of the trace retainer detached.

In the drawings 1 designates one end of a whiffletree and 2 a whiffletree hook which is provided with a metal tip or ferrule 3 which slips over the reduced end of the whiffletree 1 to prevent the same from splitting. Extending inward within the tip or ferrule 3 is a threaded screw or shank 4 which is screwed into the end of the whiffletree and serves to secure the whiffletree hook and the tip or ferrule on the end of the whiffletree.

5 designates the body of the whiffletree hook which terminates in a point or bill 6. Upon its outer face, the body of the hook is provided with outwardly extending flanges 7 located opposite each other and, under the preferred embodiment of this invention as shown in Figs. 1, 2, 3 and 6, the flanges 7 are provided at opposite points with holes as shown in Fig. 3 to receive the pivots 8 of the trace retainer 9. This trace retainer is preferably formed of a suitable length of spring wire bent into a U shape to comprise the substantially parallel side portion, the extremities of which are turned outward to form the pivots 8 which are inserted through the holes in the flanges 7. If desired, the projecting end of the retainer 9 may be given one or more coils 10 to impart increased elasticity thereto, whereby the pivots 8 are held in the holes in the flanges 7, the arms or sides of the retainer having a normal tendency to spring apart.

The flanges 7 are under-cut upon the inner side thereof as best illustrated in Fig. 3 to form shoulders 11 beneath which the arms of the retainer engage to prevent said retainer from swinging on its pivotal connection with the hook. The opposite ends of said under-cut flanges are reversely tapered or beveled off as shown at 12 so that by taking hold of the end of the retainer and pulling the same outward, the sides of the retainer are forced toward each other by the inclined or tapered ends of the flanges until said sides rest between the inner edges of the flanges whereupon the retainer may be swung through an arc of 180 degrees so as to dispose same alongside the point 6 of the hook or backward from the bend of the hook as indicated by full and dotted lines in Figs. 1 and 2. It will be seen that the under cut shoulders 11 hold the retainer securely in either position to which it is adjusted.

Instead of providing the under-cut shoulders at opposite sides of the retainer, said shoulders may be arranged centrally of the body of the hook as shown in Figs. 4 and 5 which may be accomplished by providing a central projection 13 extending lengthwise of the outer face of the body of the hook, and having the outturned oppositely projecting under-cut shoulders 14 beneath which the side arms of the retainer are caught and held, in which case, the side arms of the retainer will be given a normal tendency to move toward each other so as to insure the proper engagement between said arms and the under-cut shoulders, and the extremities of the shoulders will be beveled or inclined as shown at 15 in the same manner.

To connect the trace with the hook, the retainer 9 is moved alongside of the point of the hook as indicated by dotted lines in Figs. 1, 2 and 4 which enables the trace to be slipped over the hook and retainer at the same time. After the trace is moved upon the shank portion of the hook, the retainer is swung from the dotted line position to the full line position shown in said figures, in which position it serves as a stop to prevent the trace from slipping off the hook.

I claim:

1. A whiffletree hook comprising a bill projecting to one side of the shank of the hook and provided with a shoulder, in combination with a trace retainer pivotally connected to the hook to swing in a plane parallel to the whiffletree and embodying a portion adapted to interlock with said shoulder.

2. A whiffletree hook embodying a bill projecting to one side of the shank of the hook and also provided with an undercut shoulder, in combination with a trace retainer pivotally connected to the hook to swing in a plane parallel to the whiffletree and adapted to be moved into and out of engagement with said undercut shoulder.

3. A whiffletree hook comprising a bill projecting to one side of the shank of the hook, and a spring trace retainer pivotally connected to the hook to swing in a plane parallel with the whiffletree and adapted to snap into engagement with the shoulder on the hook.

4. A whiffletree hook embodying a bill projecting to one side of the shank of the hook and also provided with oppositely located undercut shoulders, in combination with a trace retainer pivotally connected to the hook and provided with oppositely arranged spring portions adapted to spring into and out of engagement with said shoulders.

5. A whiffletree hook embodying a bill projecting to one side of the shank of the hook and provided with undercut shoulders the opposite ends of which are beveled, in combination with a trace retainer pivotally connected with the hook to swing in a plane parallel to the whiffletree and provided with spring portions adapted to engage said undercut shoulders and the beveled end portions thereof.

6. A whiffletree hook embodying a bill projecting to one side of the shank of the hook and also provided with oppositely arranged flanges and undercut shoulders, in combination with a trace retainer having pivots engaging said flanges to adapt the retainer to swing in a plane parallel to the whiffletree, said spring portions engaging the undercut shoulders.

In testimony whereof I affix my signature in presence of two witnesses.

JOHN E. G. GEISEL.

Witnesses:
BENJAMIN H. KERSER,
A. J. DURLING.